United States Patent [19]

Cicero

[11] 4,365,575
[45] Dec. 28, 1982

[54] MARINE SCOOPERS FOR PORPOISES AND TUNA - PORPOISE-ESCAPE-WAY

[76] Inventor: Frank Cicero, 3948 5th Ave. #17, San Diego, Calif. 92103

[21] Appl. No.: 105,539

[22] Filed: Dec. 20, 1979

Related U.S. Application Data

[63] Continuation-in-part of Ser. No. 868,115, Jan. 9, 1978, abandoned, and Ser. No. 792,121, Apr. 29, 1977, abandoned.

[51] Int. Cl.$^3$ ............................................. B63B 35/14
[52] U.S. Cl. ........................................ 114/255; 43/8
[58] Field of Search ............... 114/240, 255, 270, 276, 114/282, 280; 43/4, 4.5, 6.5, 7, 8, 9, 10, 11, 14, 17.5; 37/62, 63; 119/3

[56] References Cited

U.S. PATENT DOCUMENTS

| | | | |
|---|---|---|---|
| 124,635 | 3/1872 | Smith | 43/14 |
| 1,138,541 | 5/1915 | Conekin | 43/6.5 |
| 1,304,302 | 5/1919 | Gage | 43/8 |
| 1,490,428 | 4/1924 | Paris | 43/8 |
| 2,786,582 | 3/1957 | Foster | 212/181 |
| 2,887,082 | 5/1959 | Boericke, Jr. et al. | 114/282 |
| 3,046,927 | 7/1962 | Lahde | 114/276 |
| 3,200,781 | 8/1965 | Takagi | 114/282 |
| 3,322,089 | 5/1967 | Hook | 114/282 |
| 3,465,704 | 9/1969 | Baker | 114/281 |
| 3,849,927 | 11/1974 | Gonzalves | 43/14 |
| 3,885,331 | 5/1975 | Mathieu | 37/63 |
| 3,974,923 | 8/1976 | Mark | 43/8 |
| 4,095,301 | 6/1978 | Guillen | 114/255 |

Primary Examiner—Trygve M. Blix
Assistant Examiner—Jesús D. Sotelo

[57] ABSTRACT

A barge or skiff equipped with a pair of (water tight) 7-shaped hollow arms pivotally attached to the bow sides and operated to free tuna-herding porpoises from a tuna seine enclosure and snatch and scoop up fish, a retrieval net being extended between slidable extensions of the arms. Porpoises can be steered out of the enclosure primarily after lowering any section of the corkline with weights, cable lifted by chase boats to prevent fish escape. The arms are retracted by coil springs tho pivoted down and extended by hydraulic jacks inside the springs. Giant arms with pivotal forearms can be mounted on stern cutouts or recesses of tuna purse-seiners and operated to handle the cork-line, let out porpoises, bag a catch by buoyancy, scoop up some or most fish and some mammals from a full size enclosure or purse and dump them onto deck, the seine to be pulled in intermittently over the stern between the (held up and/or extended) arms the unshrunken purse having less bends to entangle porpoises. Perhaps the purse or seine and skiff can be done away with and rounded up, bait attracted tuna scooped up from open sea or bottomless enclosure.

13 Claims, 4 Drawing Figures

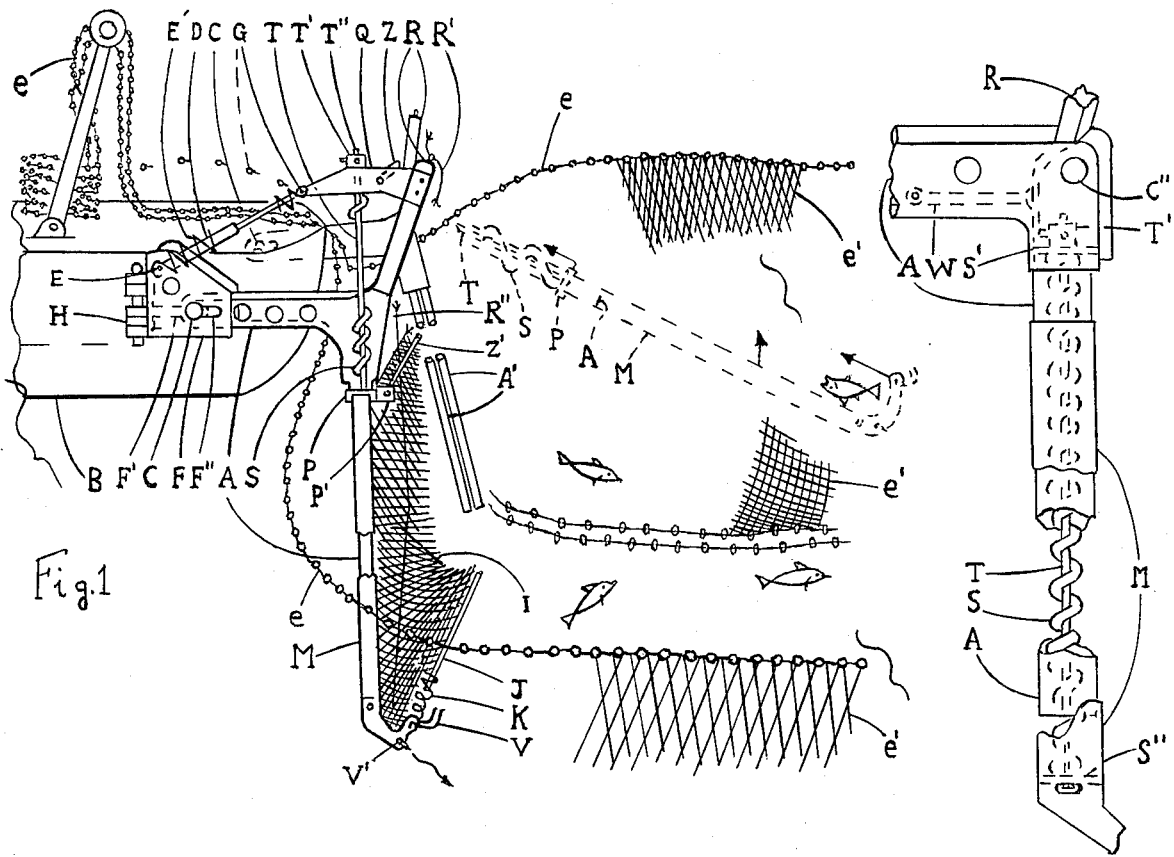
Fig. 1
Fig. 3
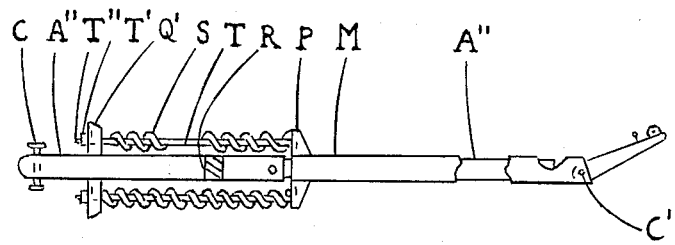
Fig. 2
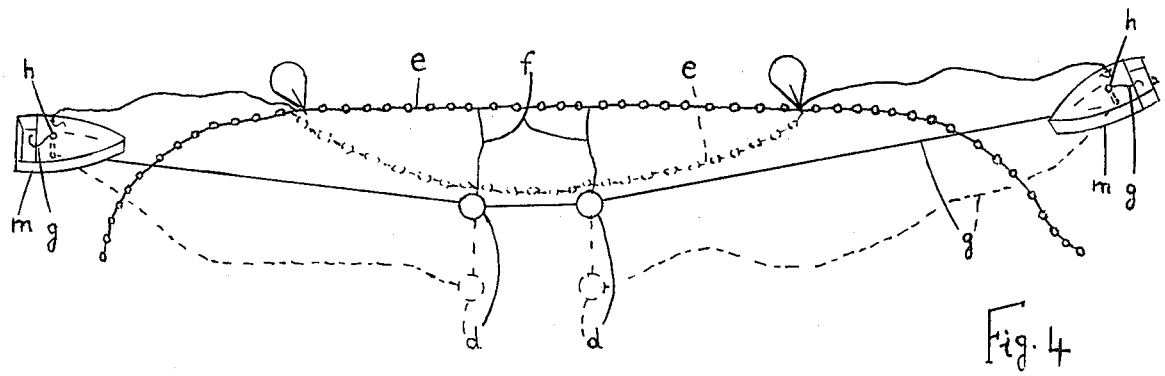
Fig. 4

MARINE SCOOPERS FOR PORPOISES AND TUNA - PORPOISE-ESCAPE-WAY

This is a continuation-in-part of abandoned applications Ser. No. 868,115 filed 1/9/78 and Ser. No. 792,121 filed 4/29/77.

The present invention provides a fish and mammals retrieving or match-scooping shallow dip-net mounted on a barge bow sides and adapted to free or untangle indispensable non-prolific tuna-herder dolphins or porpoises from a tuna seine enclosure or purse having the bottom closed by pulling a cable therefor after mammals and fish have been rounded up by chase boats presently employed by tuna purse-seiner boats. The improved scoop net can be mounted on tuna boats skiffs and features a novel pair of simple separate generally 7-shaped extendible steering or scooping preferably buoyant or hollow limbs or arms or handles and a removable barrier-retrieval net extended in-between its (slidable) dipping portions. Each arm is pivotally attached to an axle carried by a hinge or fixed preferably low to each bow or stern side (this also meaning on either side of the barge or boats centerline), produces a dipping pivotal movement and preferably is operated by hydraulic pressure. The invention further includes a novel fish retrieval method and means including said 7-shaped shallow dip-net installed on the stern of big game sport or hook and line tuna fishing boats and (preferably with pivotal forearms) on the tuna purse-seiners stern recesses and operated expeditiously inside the seine enclosure, this seine to be pulled intermittently between the arms (behind or under its net) and over the stern end or ramp and piled up on deck during retrieval operation. Chase boats circling a tuna boat and rounded up mammals and tuna behind it, this extendible giant stern dip-net can be used (without a seine enclosure) to scoop up and dump onto deck tuna and some mammals or any fish attracted by bait or light beam over the dip-net; moreover the pivotal forearms may be pivoted upwardly to a sail mast position, to reach further out and bag a catch by buoyancy. The bait (feathers on a line) could be used also in an uncrowded purse to attract tuna toward the dip-net.

Presently a difficult or unsuccessful backdown maneuver is made with the tuna boats dragging the purse bottom in order to allow porpoises (and often tuna) to move out of purse over a consequently lowered or over-lowered section of the cork-line; this maneuver possibly being a major cause of tangling and crushing of mammals which can be bruised or injured also if hauled up with semi-manual deep dip-net type trailers presently in use. Since porpoises don't jump over the cork-line, to make possible steering of mammals and sharks out of the enclosure, I provide an improvement in a method of lowering and raising a section of the line with weight and cables attached thru the bottom of a pair of chase boats. Moreover the giant stern arms can be used to pull in or push out and to push down the cork-line to let out porpoises, water jets aiding in preventing fish escape.

Referring to the drawings which are made for illustration purpose only:

FIG. 1 shows mounted on a barge or boat sides the 7-shaped scooper arms inside a seine enclosure and (in broken lines) an extended arm in pivoted position.

FIG. 2 shows a top view of a straight arm which produces inferior performance; the view is taken from below bracket Q in FIG. 1.

FIG. 3 shows an extendible arm or limb having a pivotal elbow joint and a buoyant forearm.

FIG. 4 shows an improved porpoise escape-way.

In detail: in FIG. 1 I show a barge or boat (bow or stern) B; a jet of a pair of steering or individually reciprocating scooper arms, either A or A' (only one shown of each set) having tubular dipping portions preferably single or double-barrel like a gun; these arms are backwardly-bent rigid at the elbow like a 7, preferably forming a 95° angle (possibly 130° on a tuna scooper boat) and having the or an end of the shorter portion pivotally inserted over a horizontal axle C carried by a pair of vertical support plates F shown with an oblong axle aperture F" later described. In case these plates are not used each axle C can be welded to the bow or stern sides. One long axle across the bow or stern (or two partly across) can be used and the arms mounted slidably thereon. The giant extendible stern arms of tuna boats should have the internal hollow dual dipping portions and can be mounted in a recess on each side of the ramp or in cut-outs made therefor on stern deck or ramp. A pair of hydraulic jacks D (one for each arm and only one shown) is pivotally attached to an axle E carried by an upper end of the plates F and by its piston end attached to a pinion rod G carried by an end of a bracket Q later described. A coil retraction or extension spring E', held by axles E and G, on each side of the plates F and brackets Q mounted on a tuna boat stern can effect a faster arm upward pivoting and easier fish catch if auxiliary fluid (pressure) release valves like T" (later described) are provided on the jack cylinders, however the arms may not be pivoted all the way down unless the operator disengages said springs E' by pulling them (unextended) off an axle when the arms are pivoted all the way up and tilted by jack F' later described.

Because the arms are bent backwardly (when pivoted down) these arms pull up and back while being pivoted up, so fish can be picked up or bagged and gently dumped into the bow of a barge or a receptacle therein made from a net, however surface fish above the net I may not be caught, therefore the pivotal forearms may be preferred. The plates F are parallel, have a back plate or flange welded together and can be bolted to the bow or stern sides or hinged by its back end as indicated by H. One can see there's a unit formed by the plates, the arm, the axles and jack D; these units can be placed anywhere needed. The net I hooked to the back of or slidably attached to the arm extensions M later described, has its forward end tied to a tube or pole J, this having each end attached to an end of or inserted into a helical or cylindrical coil spring K attached (by the other end) to a curved or turned up and possibly bent-in front or bottom end of the arm extensions, whereto J should abut to prevent possible inwardly bending and turning of the arms when loaded. Each arm is operable independently of the other; a one arm limited pivotal movement can head a catch downwardly on the net I when dumping, two valve levers to be provided to set either arm in motion and to scoop up fish by operating both arms. The extensions M have a pair of brackets P (see also FIG. 2) welded at its top end and surround the dipping portions of the arms as slidable tubular sleeves, a pair of coil extension springs S is attached to the brackets P and to an opposite box type bracket Q (only one shown) attached to a post R welded to the top of the arms A-A', the springs being adapted to retract fast the arm extensions when a pair of hydraulic jacks T inside the springs S operate said extensions. Hooks like two fingers V can be attached at the end of the stern arms to pull in or lift or push out the cork-line when this is inserted between them and the arm extensions are activated, as it can be visualized looking in FIG. 1; the outer finger also can be used to lower the cork-line when placed under it to let out porpoises and sharks. To stop both arms and prevent one arm overpivoting I insert a cord R' thru a ring on top of posts R in order to stop both jacks D when the cord is pulled tight. A pair of ropes or a Y-shaped cord R" attached only to the end corners of the net may be pulled from aboard to lessen sagging (if this occurs) when dumping fish. To help steer and control porpoises and fish, head lights and or water or air jets V' and video means may be mounted on the arms.

Referring to FIGS. 1–2 a straight arm assemblage F, C, A", R, Q, G, D, E, Q', P, S, T, M in pair, tilted or having axle C inserted higher on plates F, would require the arm extensions to be operated forth and back so the rear end of the net I may clear the bow during operation; C' indicates a pivotal arm end joint and a hole shown near bracket P indicates a straight arm could be pivoted upon an axle inserted therein. FIG. 3 shows an extension coil spring S and a hydraulic jack T assembled inside a large diameter thin wall forearm P1 and its extension M, a pivotal elbow joint including an axle C" thereof, a hydraulic jack W adapted to pivot and hold down the buoyant forearm and a pressure release valve or line T" connected to the jack cylinder so that by opening said valve the operator may cause the dip-net to rise from underwater under a catch by buoyancy. The pivotal extensions (in FIG. 3) should be made of light weight material such as plastic and lifted off water only when retracted. One end of the spring and of the jack T are attached to a bracket plate S' welded or bolted to and inside the arm and the other to another plate S" welded or bolted to and inside the extension. A retraction spring S and jack T can be assembled inside each one of the two forearm tubes (A') and two arm extensions M thereof (not shown in pair). I show a hydraulic jack F', bolted to the back interior of the support plates F so the arms may be pushed forward and (when pivoted all the way up) tilted backward at about 45°, the forearms then being placed out of the way when not in use; however there's no need of jacks F' and oblong apertures F" if the arms have pivotal elbow joints. A weight controlled porpoise escape way or gate is shown in FIG. 4 where a pair of lead balls or weights (d) is supported below the cork-line (e) by a tail end (f) (of a pair cords (g)) firmly tied or hooked to the line. The cords (g) (each inserted by its other end thru a small tube (h) installed between and thru the deck and bottom of a pair chase boats (m)) are pulled by these moving out one opposite another, without capsizing, to lift up the lead balls (as shown in solid lines) and allow the cork-line to rise and prevent fish escape. The lead, balloons and wound up cords may be snapped on the line aboard while lowering the seine. The retraction speed of springs S (and E') is increased and controlled by operating by pass or fluid (pressure) release valve T" or more installed at or connected to a possibly enlarged top end T' of the jack cylinders T. I provide a limbs or arms bracing member or flexible rod or pole or rigid tube Z (FIG. 1) attached to the brackets Q or to the posts R and/or another Z' (whereto an extended end of the net I can be hooked) attached to bracket extensions P' and another to the end of the arms, springs K being removed. After a small portion of the seine is pulled up or rolled up and piled on deck out of way, first the cork-line (e) has to be tied up on the ramp (not shown), then the seine (e & e') has to be rolled back a little so it lays down preferably on the top portion of the ramp and set aside close to one arm, where a channel or depression may be formed to lay the seine therein. The arms now can be pivoted up all the way and fish can be dumped gently onto and thru deck or ramp (if there's an aperture); porpoises and sharks to be diverted overboard by crew members.

I claim as my invention:

1. In at least one scoop-net equipped marine vehicle or boat or barge primarily adapted to operate within a tuna seine enclosure: a number of axles carried by the barge sides; a number of backwardly-bent scooper arms or limb pivotally attached to said axles and adapted to operate independently of one another; slidable arm extensions and retraction means therefor; a net adapted as a barrier to steer porpoises over a cork-line of and out of the enclosure and to retrieve fish and mammals, the net being extended between the extensions.

2. A vehicle or boat or barge as described in claim 1 and including: a tube or pole and a coil spring binding each end of the tube and attached at the end of the arms and adapted to prevent spilling over of fish and mammals, the net being attached also to the tube.

3. A marine vehicle or boat or barge as described in claim 1 and including: bracket means attached to the interior of each arm; bracket means attached to the interior of each arm extension; coil retraction springs and cylindrical hydraulic jacks having one end attached to each bracket means; fluid pressure release valves connected to the jacks, the arms and arm extensions being tubular.

4. A vehicle or boat or barge as described in claim 1 and including: at least one bracing member rigidly connecting and reinforcing the arms.

5. A vehicle or boat or barge as described in claim 1 and including: pivotal elbow joints provided on the arms.

6. A vehicle as described in claim 5 and including: hydraulic jacks pivotally carried by the arms, pivotally connected to the arm extensions and adapted to pivot and hold down the same; fluid pressure release valves connected to said jacks and adapted to allow the arms below the pivotal joints to rise from underwater by buoyancy.

7. A vehicle or boat or barge as described in claim 1 and including: a number of hydraulic jacks pivotally carried by the barge sides and having its piston end attached to an arm post and adapted to pivot the arms; spring retraction means adapted to pivot the arms upwardly faster, these spring means also having an end attached to said post and the other end carried by the barge sides.

8. A vehicle or boat or barge as described in claim 1, the axles being carried by the stern sides and including: a number of weights adapted to be hung on the corkline of the seine enclosure wherefrom said arms and net may scoop up and dump onto deck fish and porpoises; cord pulling means attached to the weights and to a pair of chase boats adapted to form and control a porpoise get-away gate.

9. A vehicle or boat or barge as described in claim 1 and including: upstanding support plates carried by the boat sides, each axle being carried by a pair of said plates, these plates having a connecting back plate; oblong axle apertures provided on said plates and wherethru said axles are slidably inserted; hydraulic jacks attached to said back plate and having an annular piston end surrounding said axle or axles, the jacks being adapted to push forward and tilt the arms.

10. A vehicle or boat or barge as described in claim 1 and including: a number of upstanding support-plates carried in pairs by the barge sides, the axles being carried by the plates.

11. In a scoop net equipped marine vehicle or boat or barge including: a pair of arms or limbs pivotally carried by the boat sides: arm or limb extensions slidably mounted over said arms; a net extended between the arm extensions and adapted to bag fish and porpoises by activation of the extensions and by pivoting of the arms.

12. In a seine enclosure having a cork-line open and a closed bottom and wherein fish and mammals may be captured: a number of weights adapted to be hung on the cork-line and to sink a portion thereof; a tube attached by one end to the deck and by the other to the bottom of each one of a pair chase boats; cord pulling means attached to the weights and inserted thru said tube upwardly from the bottom to prevent overtuning when the chase boats lift up the weights by pulling in opposite direction of each other.

13. In a fishing boat or barge: a number of axles carried by the barge sides; a number of generally 7-shaped arms or limbs pivotally attached by an end to the axles; a number of dipping arm extensions slidably mounted over said arms and adapted to carry a net extended in-between the extensions, power operating means being provided therefor.

* * * * *